United States Patent
Matsunaga et al.

(10) Patent No.: US 11,143,836 B2
(45) Date of Patent: Oct. 12, 2021

(54) ZOOM LENS, IMAGING DEVICE, MOVABLE OBJECT, AND SYSTEM

(71) Applicant: SZ DJI TECHNOLOGY CO., LTD., Shenzhen (CN)

(72) Inventors: Shigehiko Matsunaga, Tokyo (JP); Atsushi Ohata, Tokyo (JP); Atsuo Minato, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 311 days.

(21) Appl. No.: 16/430,091

(22) Filed: Jun. 3, 2019

(65) Prior Publication Data

US 2019/0285824 A1 Sep. 19, 2019

Related U.S. Application Data

(63) Continuation of application No. PCT/JP2016/086086, filed on Dec. 5, 2016.

(51) Int. Cl.
| | |
|---|---|
| *G02B 15/14* | (2006.01) |
| *G02B 7/02* | (2021.01) |
| *G02B 9/34* | (2006.01) |
| *G02B 13/02* | (2006.01) |
| *G02B 13/06* | (2006.01) |

(Continued)

(52) U.S. Cl.
CPC ............ *G02B 7/021* (2013.01); *G02B 9/34* (2013.01); *G02B 13/02* (2013.01); *G02B 13/06* (2013.01); *G02B 13/18* (2013.01); *G02B 15/20* (2013.01); *H04N 5/2254* (2013.01)

(58) Field of Classification Search
CPC . G02B 7/021; G02B 9/34; G02B 9/12; G02B 13/006; G02B 15/1435; G02B 15/143507
See application file for complete search history.

(56) References Cited

U.S. PATENT DOCUMENTS

2007/0229976 A1* 10/2007 Kawana ......... G02B 15/143507
359/689

FOREIGN PATENT DOCUMENTS

| JP | 2006189527 A | 7/2006 |
|---|---|---|
| JP | 2007249087 A | 9/2007 |

(Continued)

OTHER PUBLICATIONS

World Intellectual Property Organization (WIPO) International Search Report for PCT/JP2016/086086 dated Feb. 28, 2017 8 Pages.

*Primary Examiner* — Alicia M Harrington
(74) *Attorney, Agent, or Firm* — Anova Law Group, PLLC

(57) ABSTRACT

A zoom lens includes a first lens group with a negative refractive power, a second lens group with a positive refractive power, and a third lens group with a positive refractive power. When the zoom lens changes from a wide angle end to a telephoto end, a spacing between the first lens group and the second lens group is reduced, and a spacing between the second lens group and the third lens group changes. The first lens group includes a first lens, a second lens, a third lens, and a fourth lens. Refractive powers of the first lens, the second lens, and the third lens are negative, and a refractive power of the fourth lens is positive. Abbe numbers of the first lens, the second lens, and the third lens are larger than 60. A ratio of a focal length of the first lens group over a focal length of the zoom lens at a wide angle end is larger than −2.5 and smaller than −1.2.

20 Claims, 15 Drawing Sheets

(51) Int. Cl.
*H04N 5/225* (2006.01)
*G02B 13/18* (2006.01)
*G02B 15/20* (2006.01)

(56) References Cited

FOREIGN PATENT DOCUMENTS

| | | | |
|---|---|---|---|
| JP | 2010039017 | A | 2/2010 |
| JP | 2011257265 | A | 12/2011 |
| JP | 2011257625 | A | 12/2011 |
| JP | 2014098811 | A | 5/2014 |
| JP | 2014153443 | A | 8/2014 |
| JP | 201528530 | A | 2/2015 |
| JP | 2018045097 | A | 3/2018 |
| WO | 2012066735 | A1 | 5/2012 |
| WO | 2015178095 | A1 | 11/2015 |

\* cited by examiner

ZOOM LENS, IMAGING DEVICE, MOVABLE OBJECT, AND SYSTEM

CROSS-REFERENCE TO RELATED APPLICATION

This application is a continuation of International Application No. PCT/JP2016/086086, filed on Dec. 5, 2016, the entire content of which is incorporated herein by reference.

FIELD

The present disclosure relates to a zoom lens, an imaging device, a movable object, and a system.

BACKGROUND

A zoom lens is known that is configured with a negative-positive-positive three-component system (e.g., International Publication No. 2012/066735 and Japanese Unexamined Publication No. 2007-249087).

Patent Literature 1 International Publication No. 2012/066735

Patent Literature 2 Japanese Unexamined Publication No. 2007-249087

Patent Literature 3 Japanese Unexamined Publication No. 2014-98811

There is demand for a compact zoom lens with a wide angle of view and corrected chromatic aberration.

A zoom lens according to an aspect of the present disclosure can include, in order from an object side, a first lens group with negative refractive power, a second lens group with positive refractive power, and a third lens group with positive refractive power. When changing from a wide angle end to a telephoto end, a spacing between the first lens group and the second lens group can be reduced, and a spacing between the second lens group and the third lens group can change. The first lens group can include four lenses with refractive power that is, in order from the object side, negative, negative, negative, and positive. When the Abbe numbers of the three lenses with negative refractive power in the first lens group are designated v1, v2, and v3, respectively, a focal length of the first lens group is designated f1, and a focal length of the entire zoom lens at the wide angle end is designated fw, the following conditional expressions can be satisfied:

$$v1>60$$

$$v2>60$$

$$v3>60$$

$$-2.5<f1/fw<-1.2$$

The second lens group can include, on the object side, at least one aspheric lens with positive refractive power. The second lens group can include, from the aspheric lens toward a focal plane side, at least two doublets. The Abbe numbers v of all positive lenses configuring the at least two doublets can satisfy the expression v>60. When the focal length of the second lens group is designated f2, the following conditional expression can be satisfied:

$$1.3<f2/fw<2.6$$

The third lens group can be configured from a single lens or a doublet, and can be responsible for focusing.

Of the three lenses with negative refractive power in the first lens group, the lens closest to the object can be a spherical lens. At least one of the two lenses positioned on the focal plane side of this object-side lens can be an aspheric lens.

When the refractive index of the lens with positive refractive power in the first lens group is designated n4 and the Abbe number is designated v4, the following conditional expressions can be satisfied:

$$n4>1.9$$

$$v4<35$$

The zoom lens can further include an aperture that moves integrally with the second lens group when changing from the wide angle end to the telephoto end.

The second lens group can include, in order from the object side, a first lens sub-group, an aperture, and a second lens sub-group. When a spacing between a surface closest to the object side and a surface closest to the focal plane side in the first lens sub-group is designated Da, and a spacing between a surface closest to the object side and a surface closest to the focal plane side in the second lens group is designated D2, the following conditional expression can be satisfied:

$$Da/D2<0.35$$

An imaging device according to another aspect of the present disclosure can include the zoom lens and an imaging element.

A movable object according to another aspect of the present disclosure can include the zoom lens.

The movable object can be an unmanned aerial vehicle.

A system according to another aspect of the present disclosure can include the zoom lens, a carrier movably supporting the zoom lens, and a holding arm attached to the carrier.

With the zoom lens described above, a compact zoom lens can be provided that features a wide angle of view and favorably corrected aberration.

The features described above can also be arranged into a variety of sub-combinations.

DETAILED DESCRIPTION OF THE EMBODIMENTS

The present disclosure is described below using embodiments of the disclosure, but the embodiments below do not limit the disclosure. Not all combinations of features described in the embodiments are necessary to achieve the disclosure.

The scope of the claims, specification, drawings, and abstract include matters subject to protection by copyright. The owner of copyright does not raise objections to duplication by any person of these documents if it is as displayed in the files or records of the Patent Office. However, in all other cases, all copyrights are reserved.

Figure 1:
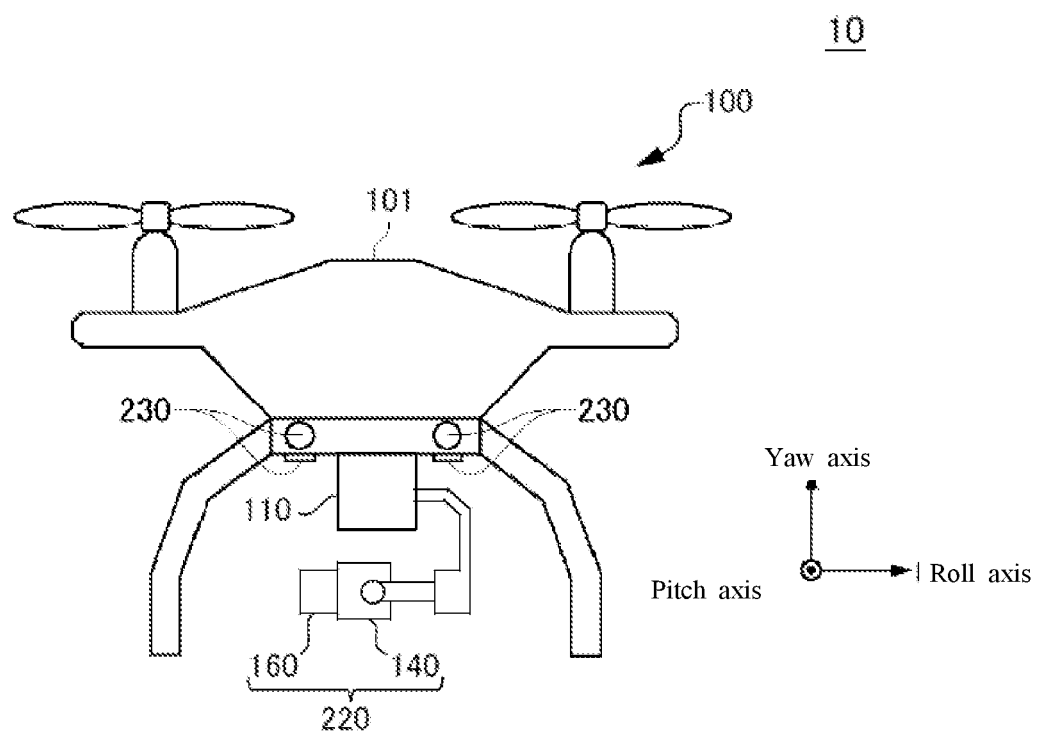
FIG. 1 schematically illustrates one example of a movable object system 10 that includes an unmanned aerial vehicle (UAV) 100 and a controller 50.
Figure 1:
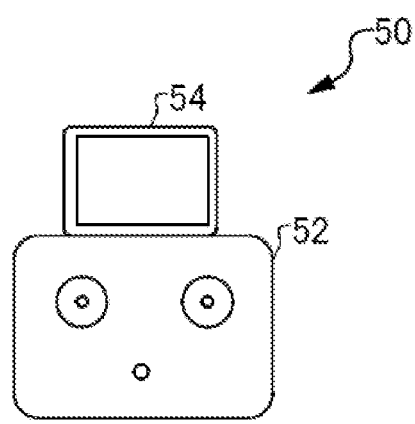

FIG. 1 schematically illustrates one example of a movable object system 10 that includes an unmanned aerial vehicle (UAV) 100 and a controller 50. The UAV 100 can include a UAV body 101, a gimbal 110, a plurality of imaging devices 230, and an imaging device 220. The imaging device 220 can include a lens device 160 and an imaging unit 140. The UAV 100 is one example of a movable object to which an imaging device is provided. The movable object can be a concept that includes, in addition to UAVs, other aerial vehicles moving in the air, vehicles moving on the ground, ships moving in the water, and the like.

The UAV body 101 can include a plurality of rotary wings. The UAV body 101 can cause the UAV 100 to fly by controlling the rotation of the plurality of rotary wings. For example, the UAV body 101 can cause the UAV 100 to fly by using four rotary wings. The number of rotary wings is not limited to four. Also, the UAV 100 can be a fixed-wing aircraft that does not have rotary wings.

The imaging device 230 can be a camera for imaging that images a subject contained in a desired imaging range. The plurality of imaging devices 230 can be cameras for sensing, which image the surroundings of the UAV 100 in order to control the flight of the UAV 100. The imaging device 230 can be fixated to the UAV body 101.

Two imaging devices 230 can be provided on a front face, which is the nose of the UAV 100. Further, another two imaging devices 230 can be provided on a bottom face of the UAV 100. The two imaging devices 230 on the front face side can act as a pair and function as what is known as a stereo camera. The two imaging devices 230 on the bottom face side can also act as a pair and function as a stereo camera. Three-dimensional spatial data of the surroundings of the UAV 100 can be generated based on the images imaged by the plurality of imaging devices 230. A distance to a subject imaged by the plurality of imaging devices 230 can be determined by a stereo camera that is configured by the plurality of imaging devices 230.

The number of imaging devices 230 provided on the UAV 100 is not limited to four. The UAV 100 can include at least one imaging device 230. The UAV 100 can include at least one imaging device 230 on each of the nose, tail, sides, bottom surface, and upper surface of the UAV 100. The imaging devices 230 can have a single focus lens or a fisheye lens. In the description of the UAV 100, the plurality of imaging devices 230 may in some cases be referred to generically as an imaging device 230.

The controller 50 can include a display unit 54 and an operation unit 52. The operation unit 52 can receive an input operation from the user for controlling an attitude of the UAV 100. Based on the user operation received by the operation unit 52, the controller 50 can transmit a signal for controlling the UAV 100. For example, the operation unit 52 can receive an operation for changing the magnification power of the lens device 160. The controller 50 can transmit a signal to the UAV 100 instructing the UAV 100 to change the magnification power.

The controller 50 can receive an image captured by at least one of the imaging device 230 and the imaging device 220. The display unit 54 can display the image received by the controller 50. The display unit 54 can be a touch-type panel. The controller 50 can receive the user's input operation through the display unit 54. The display unit 54 can receive, for example, a user operation in which the user provides an instruction giving the position of a subject to be imaged by the imaging device 220.

The imaging unit 140 can generate and record image data of optical images formed via the lens device 160. The lens device 160 can be integrally provided with the imaging unit 140. The lens device 160 can be a so-called "interchangeable lens," and can be detachably provided on the imaging unit 140.

The gimbal 110 can include a carrier that movably supports the imaging device 220. The imaging device 220 can be attached to the UAV body 101 via the gimbal 110. The gimbal 110 can rotatably support the imaging device 220 to rotate centered on the pitch axis. The gimbal 110 can rotatably support the imaging device 220 to rotate centered on the roll axis. The gimbal 110 can rotatably support the imaging device 220 to rotate centered on the yaw axis. The gimbal 110 can rotatably support the imaging device 220 to rotate centered on at least one of the pitch axis, the roll axis, and the yaw axis. The gimbal 110 can rotatably support the imaging device 220 to rotate centered on each of the pitch axis, the roll axis, and the yaw axis. The gimbal 110 can hold the imaging unit 140. The gimbal 110 can hold the lens device 160. The gimbal 110 can change an imaging direction of the imaging device 220 by rotating the imaging unit 140 and the lens device 160 centered on at least one of the yaw axis, the pitch axis, and the roll axis.

Figure 2:
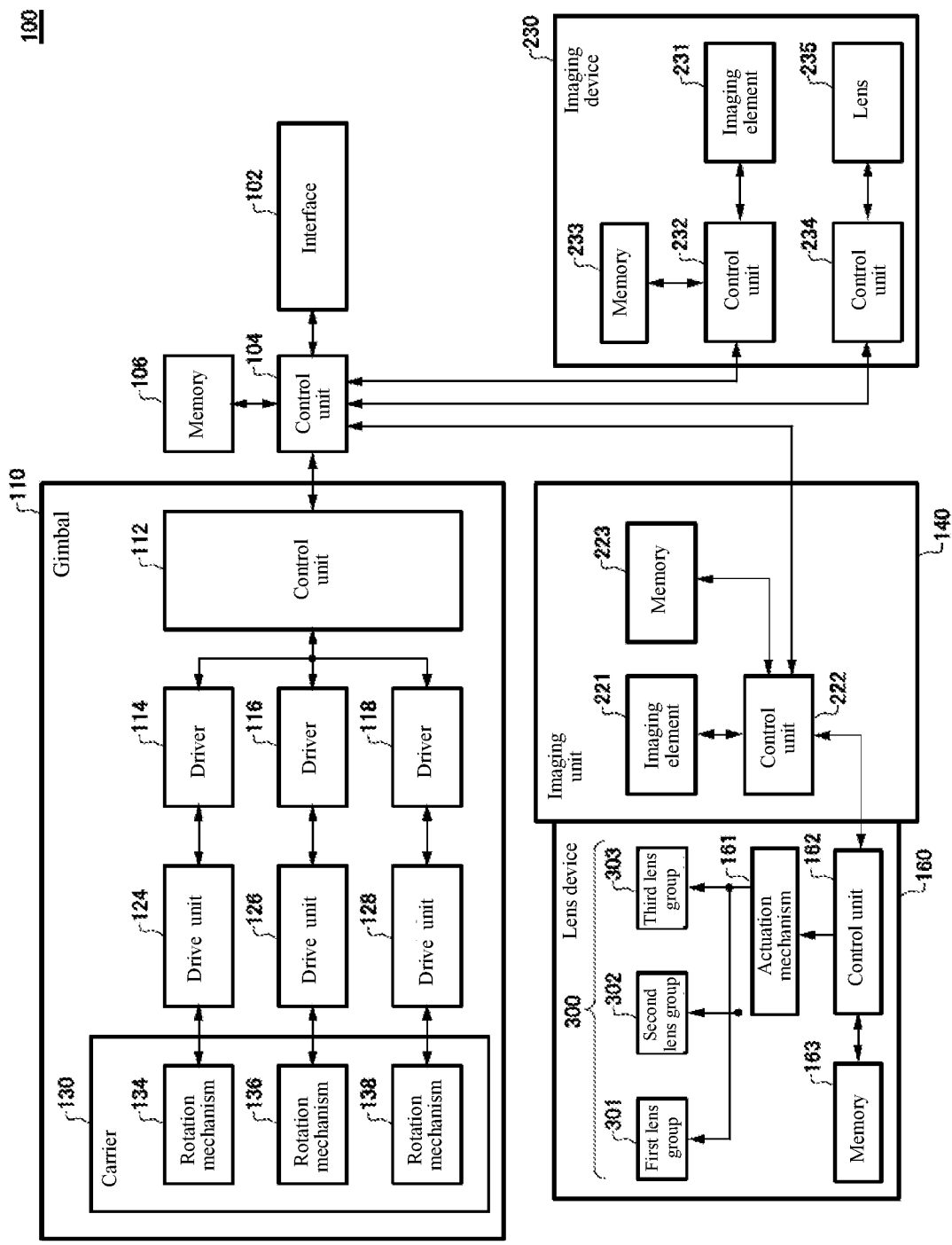
FIG. 2 illustrates one example of a function block of the UAV 100.

FIG. 2 illustrates one example of a function block of the UAV 100. The UAV 100 can include an interface 102, a control unit 104, a memory 106, the gimbal 110, the imaging unit 140, and the lens device 160.

The interface 102 can communicate with the controller 50. The interface 102 can receive a variety of instructions from the controller 50. The control unit 104 can control the flight of the UAV 100 following the instructions received from the controller 50. The control unit 104 can control the gimbal 110, the imaging unit 140, and the lens device 160. The control unit 104 can be configured from a microprocessor such as a CPU or MPU, a microcontroller such as an MCU, or the like. The memory 106 stores programs and the like necessary for the control unit 104 to control the gimbal 110, the imaging unit 140, and the lens device 160.

The memory 106 can be a computer-readable recording medium, and can include at least one from among SRAM, DRAM, EPROM, EEPROM, and flash memory such as USB memory. The memory 106 can be provided to the housing of the UAV 100. The memory 106 can be provided such that it is removable from the housing of the UAV 100.

The gimbal 110 can include a control unit 112, a driver 114, a driver 116, a driver 118, a drive unit 124, a drive unit 126, a drive unit 128, and a carrier 130. The drive units 124, 126, and 128 can be motors.

The carrier 130 can support the imaging device 220. The carrier 130 can support the imaging device 220 such that the imaging direction of the imaging device 220 can be adjusted. The carrier 130 can rotatably support the imaging unit 140 and the lens device 160 such that the imaging unit 140 and the lens device 160 can rotate centered on the yaw axis, the pitch axis, and the roll axis. The carrier 130 can include a rotation mechanism 134, a rotation mechanism 136, and a rotation mechanism 138. Using the drive unit 124, the rotation mechanism 134 can rotate the imaging unit 140 and the lens device 160 centered on the yaw axis. Using the drive unit 126, the rotation mechanism 136 can rotate the imaging unit 140 and the lens device 160 centered on the pitch axis. Using the drive unit 128, the rotation mechanism 138 can rotate the imaging unit 140 and the lens device 160 centered on the roll axis.

In accordance with an action instruction for the gimbal 110 provided from the control unit 104, the control unit 112 can output action instructions to the drivers 114, 116, and 118 indicating a rotation angle for each. The drivers 114, 116, and 118 can drive the drive units 124, 126, and 128, respectively, according to the action instructions indicating the rotation angle for each. The drive units 124, 126, and 128 can respectively drive each of the rotation mechanisms 134, 136, and 138 to rotate, thus changing the attitude of the imaging unit 140 and the lens device 160.

The imaging unit 140 can capture an image using light that passes through a lens system 300. The imaging unit 140 can include a control unit 222 (e.g., a controller), an imaging element 221 (e.g., a photosensor), and a memory 223. The control unit 222 can be configured from a microprocessor such as a CPU or MPU, a microcontroller such as an MCU, or the like. The control unit 222 can control the imaging unit 140 and the lens device 160 according to action instructions for the imaging unit 140 and the lens device 160 provided from the control unit 104. The control unit 222 can, based on a signal received from the controller 50, output to the lens device 160 a control instruction instructing the lens device 160 to change the focal length.

The memory 223 can be a computer-readable recording medium, and can include at least one from among SRAM, DRAM, EPROM, EEPROM, and flash memory such as USB memory. The memory 223 can be provided inside the housing of the imaging unit 140. The memory 223 can be provided such that it is removable from the housing of the imaging unit 140.

The imaging element 221 is carried inside the housing of the imaging unit 140, and can generate and output to the control unit 222 image data of an optical image formed via the lens device 160. The control unit 222 can store the image data output from the imaging element 221 in the memory 223. The control unit 222 can output image data to the memory 106 to be stored therein, via the control unit 104.

The lens device 160 can be a zoom lens. The lens device 160 can be a full-focal-range variable zoom lens. The lens device 160 can be a comparatively wide angle zoom lens. The lens device 160 can be a three-component zoom lens. The lens device 160 can include a control unit 162, a memory 163 an actuation mechanism 161, and the lens system 300. The lens system 300 can include, in order from the object side, a first lens group 301, a second lens group 302, and a third lens group 303. In the description of the present embodiment, an optical axis of the lens system 300 may be referred to simply as "the optical axis." Also, the term "lens group" refers to a grouping of one or more lenses. A lens component configured by a single lens is also referred to as a "lens group."

Following control instructions from the control unit 222, the control unit 162 can move at least one of the first lens group 301, the second lens group 302, and the third lens group 303 along the optical axis. For example, when changing the focal length, the control unit 162 can move the first lens group 301, the second lens group 302, and the third lens group 303 along the optical axis. This prevents the focus position from shifting when changing the focal length. An image formed by the lens system 300 of the lens device 160 can be imaged by the imaging unit 140.

The actuation mechanism 161 actuates the first lens group 301, the second lens group 302, and the third lens group 303. The actuation mechanism 161 can include, for example, an actuator and a holding member that holds the first lens group 301, the second lens group 302, and the third lens group 303. A drive pulse can be supplied to the actuator from the control unit 162. The actuator can displace by a drive amount corresponding to the supplied pulse. By displacing the holding member in accordance with the displacement of the actuator, the first lens group 301, the second lens group 302, and the third lens group 303 can be displaced.

The lens device 160 can be integrally provided with the imaging unit 140. The lens device 160 can be a so-called "interchangeable lens," and can be detachably provided on the imaging unit 140.

The imaging device 230 can include a control unit 232, a control unit 234, the imaging element 231, a memory 233, and a lens 235. The control unit 232 can be configured from a microprocessor such as a CPU or MPU, a microcontroller such as an MCU, or the like. The control unit 232 can control the imaging element 231 according to action instructions for the imaging element 231 provided from the control unit 104.

The control unit 234 can be configured from a microprocessor such as a CPU or MPU, a microcontroller such as an MCU, or the like. The control unit 234 can control the focal length of the lens 235 according to action instructions for the lens 235 provided from the control unit 104. The control unit 234 can control the focal point of the lens 235 according to the action instructions for the lens 235. The control unit 234 can control the aperture of the lens 235 according to the action instructions for the lens 235.

The memory 233 can be a computer-readable recording medium, and can include at least one from among SRAM, DRAM, EPROM, EEPROM, and flash memory such as USB memory.

The imaging element 231 can generate and output to the control unit 232 image data of an optical image formed via the lens 235. The control unit 232 can store the image data output from the imaging element 231 in the memory 233.

In the present embodiment, an example is described in which the UAV 100 includes the control unit 104, the control unit 112, the control unit 222, the control unit 232, the control unit 234, and the control unit 162. However, processes that are executed by a plurality of the control units 104, 112, 222, 232, 234, and 162 can instead be executed by any one of the control units. A process that is executed by the control units 104, 112, 222, 232, 234, and 162 can instead be executed by a single control unit. In the present embodiment, an example is described in which the UAV 100 includes the memory 106, the memory 223, and the memory 233. Information that is stored in at least one of the memories 106, 223, and 233 can be stored in a different one or plurality of the memories 106, 223, and 233.

The first lens group 301 in the lens system 300 can be negatively refractive. The second lens group 302 can be positively refractive. The third lens group 303 can be positively refractive. The first lens group 301, the second lens group 302, and the third lens group 303 can be provided in that order from the object side. In discussing the present embodiment, descriptions of the behavior of the lens system 300 during a change in focal length refer to behavior where the lens device 160 is functioning as a zoom lens for a subject at an infinite distance.

When changing from a wide angle end to a telephoto end, a spacing between the first lens group 301 and the second lens group 302 can be reduced. When changing from the wide angle end to the telephoto end, a spacing between the second lens group 302 and the third lens group 303 can change. When changing from the wide angle end to the telephoto end, the spacing between the second lens group 302 and the third lens group 303 can increase, or can decrease.

The first lens group 301 can include four lenses with refractive power that is, in order from the object side, negative, negative, negative, and positive. The Abbe numbers of the three lenses with negative refractive power in the first lens group 301 can be designated v1, v2, and v3, respectively, and can satisfy the following conditional expressions:

$$v1>60 \quad \text{(Conditional Expression 1)}$$

$$v2>60 \quad \text{(Conditional Expression 2)}$$

$$v3>60 \quad \text{(Conditional Expression 3)}$$

In the first lens group 301, the negative refractive power can be distributed between three lenses with negative refractive power, and therefore the overall negative refractive power of the first lens group 301 can be increased. Thus, the total length of the lens system 300 can be shortened. In addition, imaging characteristics can also be enhanced. By distributing the negative refractive power of the first lens group 301 between the three lenses with negative refractive power, lenses with negative refractive power can be created using low-dispersion materials. Accordingly, chromatic aberrations can be more powerfully corrected. In some embodiments, in order to more powerfully correct chromatic aberrations, the following conditional expressions are met: v1>65, v2>65, and v3>65.

When the focal length of the first lens group 301 is f1 and the focal length of the entire system (lens system 300) at the wide angle end is fw, the following conditional expression is true:

$$-2.5<f1/fw<-1.2 \quad \text{(Conditional Expression 4)}$$

By satisfying the upper bound of Conditional Expression 4 (i.e., when the refractive power of the first lens group 301 is greater than a predetermined lower bound threshold value), the lens system 300 can be made smaller. By satisfying the lower bound of Conditional Expression 4 (i.e., by ensuring that the refractive power of the first lens group 301 does not equal or exceed a predetermined upper bound threshold value), the imaging characteristics can be enhanced.

With the lens system 300, a three-component system that is negative-positive-positive can be configured that satisfies the above-noted conditional expressions, and thereby a lens system can be created that is small in size while maintaining enhanced imaging characteristics in wide angle.

When changing from the wide angle end to the telephoto end, the first lens group 301 can move relative to the imaging element 221. When changing from the wide angle end to the telephoto end, the spacing between the first lens group 301 and the imaging element 221 can be reduced. When changing from the wide angle end to the telephoto end, the spacing between the first lens group 301 and the imaging element 221 can be reduced for the total range from the angle of view at the wide angle end to the angle of view at the telephoto end. The spacing between the first lens group 301 and the imaging element 221 can also be reduced over only a range from the angle of view at the wide angle end to a predetermined angle of view when changing from the wide angle end to the telephoto end.

The second lens group 302 can include, on the object side, at least one aspheric lens with positive refractive power.

In order to increase the positive refractive power of the second lens group 302, the positive refractive power of each lens configuring the second lens group 302 must be increased. In this example, by increasing the positive refractive power of the object-side lens in particular, the total length of the lens system 300 during telephoto imaging can be shortened. Moreover, by using an aspheric lens as the lens with sizable refractive power, aberrations can be corrected effectively.

The second lens group 302 can include, from the object-side aspheric lens toward the focal plane side, at least two doublets. The Abbe numbers v of all the positive lenses configuring the at least two doublets can satisfy the expression v>60.

When the Abbe numbers of the second lens group 302 lenses with positive refractive power are all set to 60 or more, the refractive power of the second lens group 302 can be increased and chromatic aberration can be inhibited. Accordingly, imaging characteristics can be enhanced and the lens system 300 can be made smaller.

When the focal length of the second lens group 302 is f2, the following conditional expression can be satisfied:

$$1.3<f2/fw<2.6 \quad \text{(Conditional Expression 5)}$$

By satisfying the upper bound of Conditional Expression 5 (i.e., when the refractive power of the second lens group 302 is greater than a predetermined lower bound threshold value), the lens system 300 can be made smaller. By satisfying the lower bound of Conditional Expression 5 (i.e., by ensuring that the refractive power of the second lens group 302 does not equal or exceed a predetermined upper bound threshold value), the imaging characteristics can be enhanced.

The third lens group 303 can be configured from a single lens or a doublet. The third lens group 303 can be responsible for focusing. The third lens group 303 can be responsible for at least a portion of the focusing of the lens system 300, or can be responsible for a major portion of the focusing of the lens system 300.

In order to accomplish the focusing, at least one of the lens groups must be actuated. By making the lens group that is responsible for focusing in the lens system 300 a single lens or a doublet, the actuation mechanism for the lens can be simplified. In addition, an actuation element for the lens can be made lighter. This also allows the lens system 300 overall to be made smaller.

The third lens group 303 can be responsible for vibration-proofing in the lens system 300. The third lens group 303 can be responsible for vibration-proofing as well as focusing. In order to accomplish the optical vibration-proofing, at least one of the lens groups must be actuated. By making the lens group that is responsible for vibration-proofing in the lens system 300 a single lens or a doublet, the actuation mechanism for the lens can be simplified. In addition, an actuation element for the lens can be made lighter. This also allows the lens system 300 overall to be made smaller.

Of the three lenses with negative refractive power in the first lens group 301, the lens closest to the object can be a spherical lens. At least one of the two lenses positioned on the focal plane side of this object-side lens can be an aspheric lens.

A difference between the height of an axial light ray and an ambient light ray increases at the position of the object-side lens. The first lens group 301 is positioned closest to the object side in the lens system 300, and by making at least one of the two lenses positioned on the focal plane side an aspheric lens, distortion and field curvature can be corrected effectively. In addition, by making the object-side lens, which has the greatest effective diameter, a spherical lens, costs can be reduced as compared to a case where the object-side lens is an aspheric lens.

When the refractive index of the lens with positive refractive power in the first lens group 301 is n4 and the Abbe number is v4, the following conditional expressions can be satisfied:

$n4>1.9$ (Conditional Expression 6)

$v4<35$ (Conditional Expression 7)

When the lens with positive refractive power in the first lens group 301 satisfies Conditional Expressions 6 and 7 above, the optical axis-direction thickness of the first lens group 301 can be reduced. This can contribute to shortening the total length of the lens system 300.

The second lens group 302 can include, in order from the object side, a first lens sub-group, an aperture, and a second lens sub-group. When a spacing between a surface closest to the object side and a surface closest to the focal plane side in the first lens sub-group is designated Da, and a spacing between a surface closest to the object side and a surface closest to the focal plane side in the second lens group 302 is designated D2, the following conditional expression can be satisfied:

$Da/D2<0.35$ (Conditional Expression 8)

The lens system 300 can include an aperture that moves integrally with the second lens group 302 when changing from the wide angle end to the telephoto end When the spacing of the first lens sub-group on the optical axis satisfies the conditional expression, the aperture can be positioned closer to the object side in the second lens group 302. This allows the diameter of the lenses in the first lens group 301 to be reduced.

With the lens system 300 described above, aberration such as chromatic aberration can be favorably corrected, and a compact zoom lens can be provided that features a wide angle of view and high resolution. For example, a wide-angle zoom lens can be provided that is compact, features high resolution, and includes a half-angle of view at the wide angle end that exceeds 45°.

Figure 3:
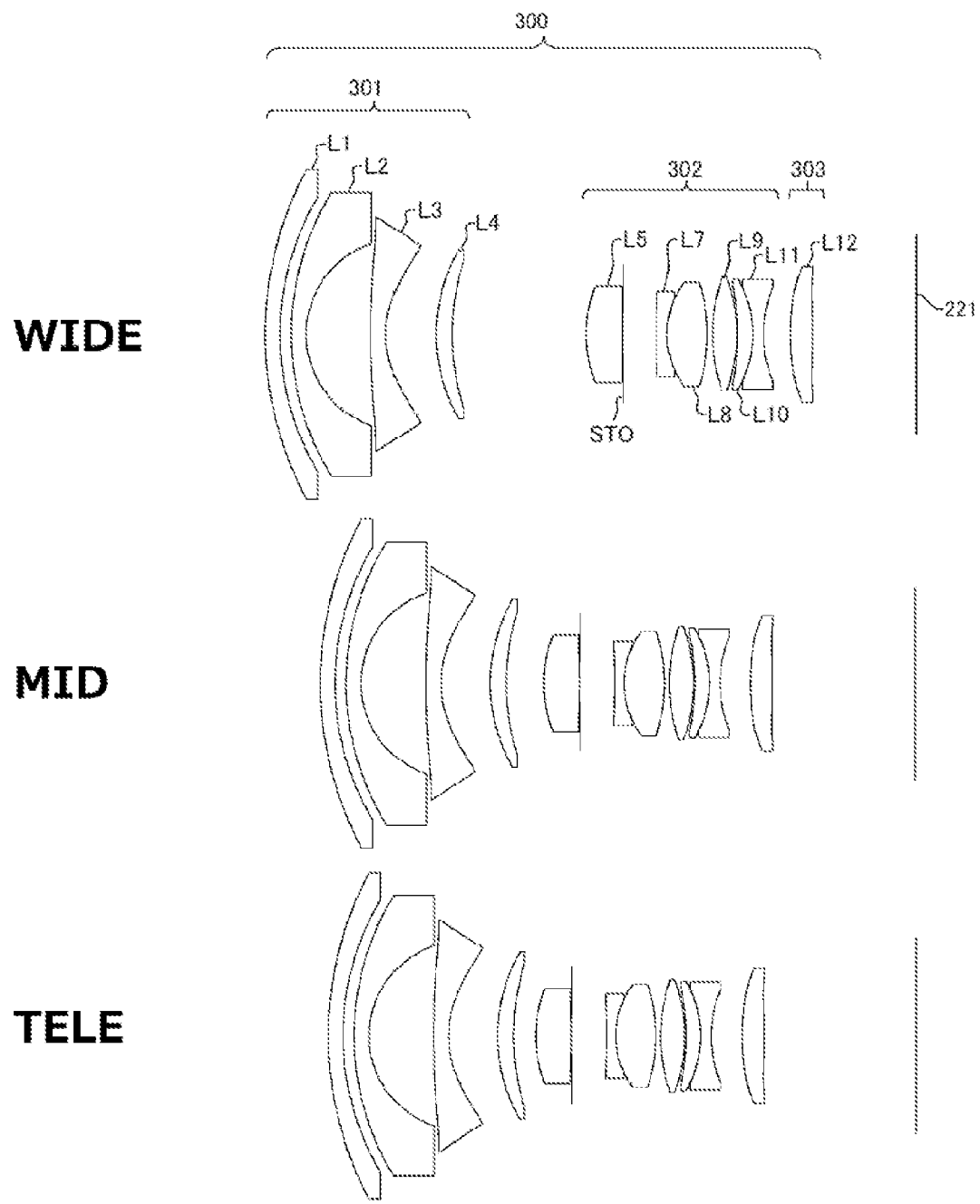
FIG. 3 illustrates lens configurations of a lens system 300 according to a first example.

FIG. 3 illustrates lens configurations of the lens system 300 according to a first example, together with the imaging element 221. FIG. 3 illustrates the positions of the first lens group 301, the second lens group 302, and the third lens group 303 at each of the wide angle end, an intermediate angle of view, and the telephoto end. "STO" indicates the aperture.

The significance of the reference signs and the like used in the description of the examples of the lens system 300 are described herewith. The lens system 300 contains a plurality of surfaces, which are identified by a surface number i. The leading surface of a lens, as viewed from the object side, is designated as a first surface, and subsequent surface numbers count upwards in the order that a light ray passes through the surface. "Di" indicates the spacing on the optical axis between an ith surface and an i+1th surface.

"f" indicates the focal length. "Fno" indicates the F number. "ω" indicates the half-angle of view. "R" indicates the radius of curvature. For the radius of curvature, "INF" indicates a flat surface. "n" indicates the refractive index. "v" indicates the Abbe number. The refractive index n and the Abbe number v are values on the d-line ($\lambda$=587.6 nm).

Table 1 indicates lens data for the lenses in the lens system 300 of the first example. Table 1 gives the Di, n, and v associated with each surface number i.

TABLE 1

| Surface no. | R | Di | n | v |
|---|---|---|---|---|
| 1 | 29.4169 | 1.250 | 1.497 | 81.61 |
| 2 | 22.5600 | 0.950 | | |
| 3 | 22.7094 | 1.269 | 1.497 | 81.61 |
| 4 | 8.1063 | 5.445 | | |
| 5* | 74.1814 | 1.269 | 1.497 | 81.61 |
| 6* | 8.7017 | 4.190 | | |
| 7 | 14.2495 | 1.363 | 1.95375 | 32.32 |
| 8 | 20.5557 | 11.339 | | |
| 9* | 11.2431 | 3.047 | 1.59201 | 67.02 |
| 10* | −57.3557 | 0.000 | | |
| STO | INF | 2.976 | | |
| 11 | −75.0514 | 0.800 | 1.755201 | 27.5795 |
| 12 | 7.3021 | 3.415 | 1.497 | 81.61 |
| 13 | −14.6233 | 0.431 | | |
| 14 | 14.5424 | 2.062 | 1.92286 | 20.88 |
| 15 | −13.5782 | 0.100 | | |
| 16 | −19.1441 | 1.256 | 1.497 | 81.61 |
| 17 | −9.2012 | 0.900 | 1.84666 | 23.78 |
| 18 | 10.4240 | 2.280 | | |
| 19* | 21.9579 | 1.869 | 1.59201 | 67.02 |
| 20* | −80 | 8.788 | | |
| 21 | INF | 0.000 | | |

Those surfaces in Table 1 having a * appended to the surface number are aspheric surfaces. Table 2 gives the surface numbers of the aspheric surfaces and their aspheric parameters. In Table 2, "κ" indicates the conic constant. "A," "B," "C," and "D" are, respectively, fourth-order, sixth-order, eighth-order, and tenth-order aspheric coefficients. Further, for the aspheric coefficients, "E-i" indicates scientific notation for base ten. In other words, "E-i" represents "$10^{-i}$." For example, "−1.59777E−05" represents "$-1.59777 \times 10^{-5}$."

TABLE 2

| Surface no. | K | A | B | C | D |
|---|---|---|---|---|---|
| 5 | 0.00000E+00 | −1.59777E−05 | 3.95992E−07 | −5.93608E−09 | 6.26080E−12 |
| 6 | 0.00000E+00 | −1.80789E−04 | −2.49179E−06 | 8.78091E−09 | −8.01188E−10 |
| 9 | 0.00000E+00 | 1.14409E−05 | 1.08270E−06 | 1.54490E−07 | 0.00000E+00 |
| 10 | 0.00000E+00 | 2.24748E−04 | 2.44633E−06 | 2.51330E−07 | 0.00000E+00 |
| 19 | 0.00000E+00 | 1.60635E−04 | 1.12852E−06 | 4.45422E−08 | 0.00000E+00 |
| 20 | 0.00000E+00 | 2.24457E−04 | 2.14617E−07 | 7.22202E−08 | 0.00000E+00 |

When "x" is defined as the distance in the optical axis direction from the vertex of the lens surface, "y" is defined as the height in a direction perpendicular to the optical axis, and "c" is defined as the paraxial curvature at the vertex of the lens, an aspheric shape can be defined by the following formula.

$$x = cy^2/(1+(1-(1+\kappa)c^2y^2)^{1/2}) + Ay^4 + By^6 + Cy^8 + Dy^{10}$$

"x" may also be referred to as the amount of sag. "y" may also be referred to as the image height. The paraxial curvature is the reciprocal of the radius of curvature.

Table 3 gives the focal lengths of the lens system 300 at each of the wide angle end, the intermediate angle of view, and the telephoto end, and gives the F number and the half-angle of view. The focal length is a value for light at a wavelength of 546.07 nm.

TABLE 3

| | Wide angle end | Intermediate angle of view | Telephoto end |
|---|---|---|---|
| f | 7.540 | 11.160 | 12.064 |
| Fno | 3.580 | 3.580 | 3.580 |
| ω | 48.163 | 36.275 | 34.649 |

When the lens system 300 changes the focal length between the wide angle end and the telephoto end, a surface spacing D8 between the first lens group 301 and the second lens group 302, a surface spacing D18 between the second lens group 302 and the third lens group 303, and a surface spacing D20 between the third lens group 303 and the imaging element 221 can change. Table 4 gives the focal lengths and the surface spacings of the entire lens system 300 at each of the wide angle end, the intermediate angle of view, and the telephoto end.

TABLE 4

| | Wide angle end | Intermediate angle of view | Telephoto end |
|---|---|---|---|
| f | 7.540 | 11.160 | 12.064 |
| D8 | 11.339 | 3.181 | 1.900 |
| D18 | 2.280 | 2.579 | 2.649 |
| D20 | 8.789 | 12.145 | 13.000 |

Table 5 indicates the focal length of each of the first lens group 301, the second lens group 302, and the third lens group 303.

TABLE 5

| Lens group | Focal length |
|---|---|
| First lens group | −14.09 |
| Second lens | 14.86 |

TABLE 5-continued

| Lens group | Focal length |
|---|---|
| group | |
| Third lens group | 29.20 |

Figure 4:
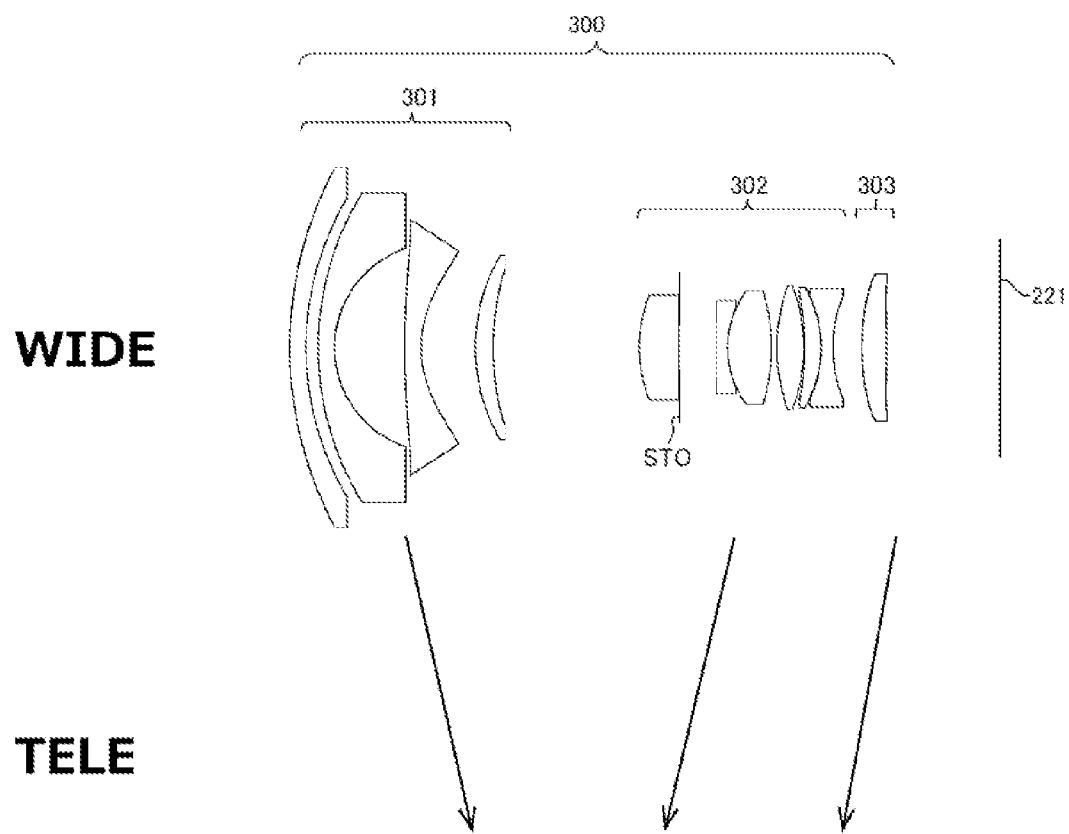
FIG. 4 schematically illustrates a movement path of each lens group when changing from a wide angle end to a telephoto end.

FIG. 4 schematically illustrates a movement path traveled by the first lens group 301, the second lens group 302, and the third lens group 303 when the lens system 300 changes from the wide angle end to the telephoto end. Arrows indicate movement during the change in focal length of the lens system 300. As illustrated in FIGS. 3 and 4, the space from the first lens group 301 to the imaging element 221 is variable.

The first lens group 301 can include four lenses: from the object side, a negative lens L1, a negative lens L2, a negative lens L3, and a positive lens L4. Accordingly, an off-axis light ray on the wide angle side that has a larger incident angle, in particular, can be gently bent. Therefore, off-axis aberrations such as distortion, coma, and field curvature can be favorably corrected. In addition, spherical aberration on the telephoto side can be favorably corrected. Also, because the negative refractive power of the first lens group 301 is distributed between the three negative lenses L1 to L3, the negative refractive power of the first lens group 301 can be increased while limiting aberration. Furthermore, the total length of the lens system 300 can be shortened.

The Abbe number v of the negative lenses L1 to L3 of the first lens group 301 can all satisfy the conditional expression v>60. In some embodiments, the Abbe number v of the negative lenses L1 to L3 can all satisfy the conditional expression v>65. The negative lenses included in the first lens group 301 can be formed of a low-dispersion glass material, and thereby chromatic aberration of magnification on the wide angle side and axial chromatic aberration on the telephoto side can be favorably corrected.

The second lens group 302 can include, from the object side, a positive single lens L5, an aperture STO, a negative/positive doublet L7 and L8, a positive single lens L9, and a positive/negative doublet L10 and L11. The single lens L5 can correspond to the first lens sub-group described above. The negative/positive doublet L7 and L8 can correspond to the second lens sub-group described above. An object-side surface and a focal plane-side surface of the positive single lens L5 can be aspheric. When at least one surface of the positive single lens L5, which is closest to the object side, is configured to be aspheric, spherical aberration can be more favorably corrected. The positive single lens L5 may also include only one surface that is aspheric.

The aperture STO can be positioned between the positive single lens L5 and the negative/positive doublet designated by L7 and L8. With such an arrangement, the spacing between the first lens group 301 and the second lens group 302 can be shortened on the telephoto side. Thus, the total length of the lens system 300 can be shortened.

As illustrated in FIGS. 3 and 4, the space between the first lens group 301 (with negative refractive power) and the imaging element 221 is variable when changing from the wide angle end to the telephoto end. When changing from the wide angle end to the telephoto end, the first lens group 301 can move monotonically toward the imaging element 221. When changing from the wide angle end to the telephoto end, the second lens group 302 can move monotonically from the imaging element 221 side toward the object. When changing from the wide angle end to the telephoto end, the third lens group 303 can move monotonically toward the object. The second lens group 302 is primarily responsible for changing the focal length, and the third lens group 303 assumes secondary responsibility for changing the focal length. The third lens group 303 can also be responsible for correcting focal plane variation that accompanies the change in focal length.

Figure 5:
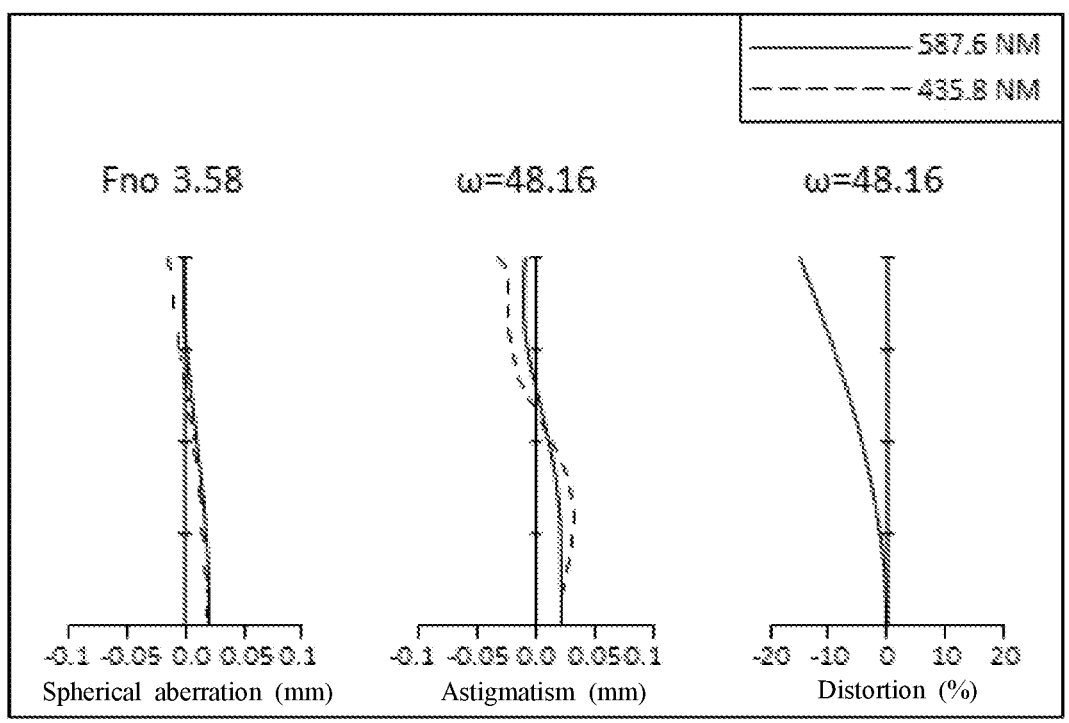
FIG. 5 illustrates spherical aberration, astigmatism, and distortion at the wide angle end.
Figure 6:
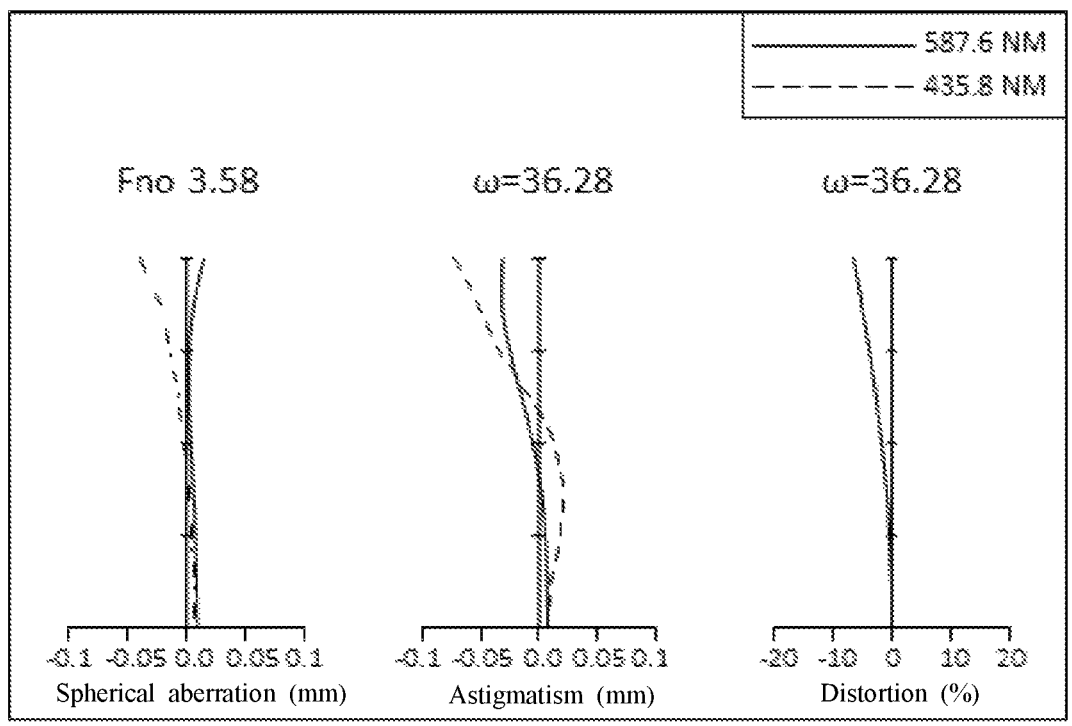
FIG. 6 illustrates spherical aberration, astigmatism, and distortion at an intermediate angle of view.
Figure 7:
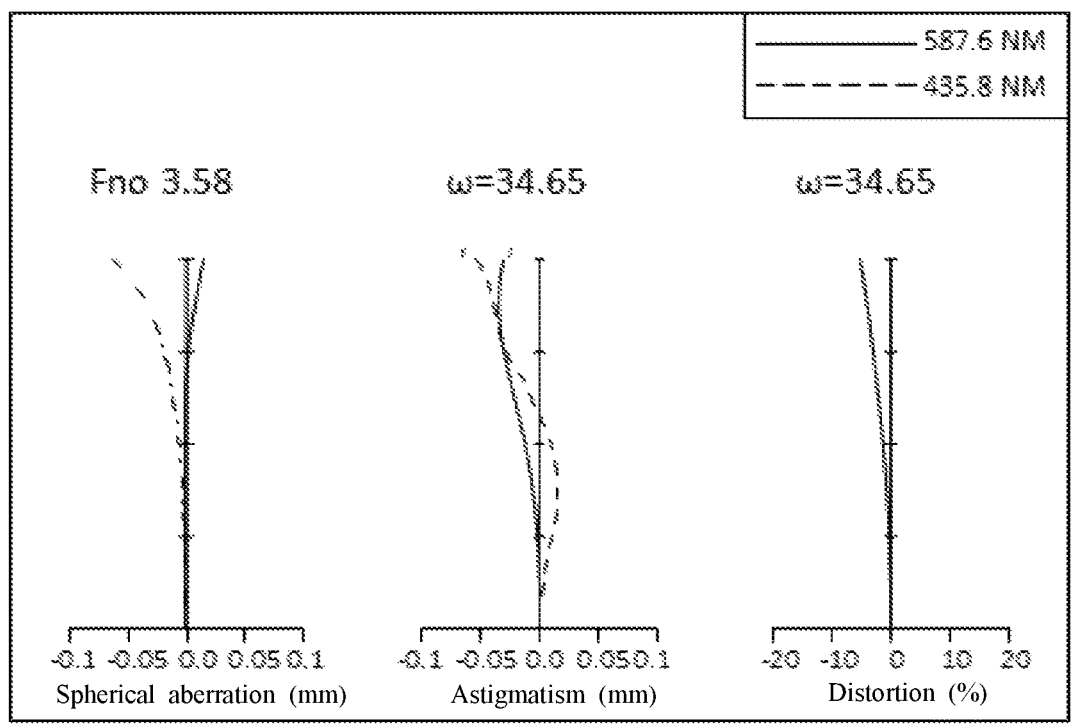
FIG. 7 illustrates spherical aberration, astigmatism, and distortion at the telephoto end.

FIG. 5 illustrates spherical aberration, astigmatism, and distortion at the wide angle end. FIG. 6 illustrates spherical aberration, astigmatism, and distortion at the intermediate angle of view. FIG. 7 illustrates spherical aberration, astigmatism, and distortion at the telephoto end.

In the spherical aberration diagrams depicted in FIGS. 5 to 7, a solid line indicates the d-line (587.6 nm) value and a dashed line indicates the g-line (435.8 nm) value. In the astigmatism diagrams depicted in FIGS. 5 to 7, a solid line indicates the d-line sagittal plane value and a dashed line indicates the d-line meridional plane value. The distortion diagrams depicted in FIGS. 5 to 7 illustrate values for the d-line. Each of these aberration diagrams makes clear that the various aberrations can be favorably corrected in the lens system 300, and that the lens system 300 can provide superior imaging performance.

Figure 8:
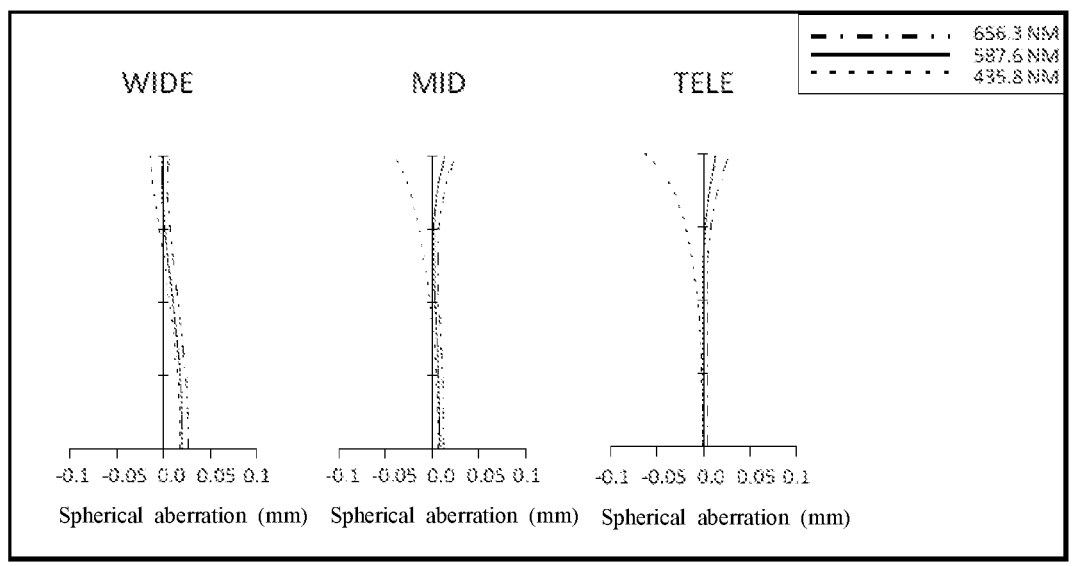
FIG. 8 illustrates the spherical aberration of the lens system 300 with light at three wavelengths.

FIG. 8 illustrates the spherical aberration of the lens system 300 with light at three wavelengths. A dot-dash line indicates the c-line (656.3 nm) value, a solid line indicates the d-line (587.6 nm) value, and a dashed line indicates the g-line (435.8 nm) value. At each of the wide angle end, intermediate angle of view, and telephoto end, the spherical aberration for each wavelength of light can be constrained to a range within 0.1 mm. This makes clear that chromatic aberration can be favorably corrected.

Figure 9:
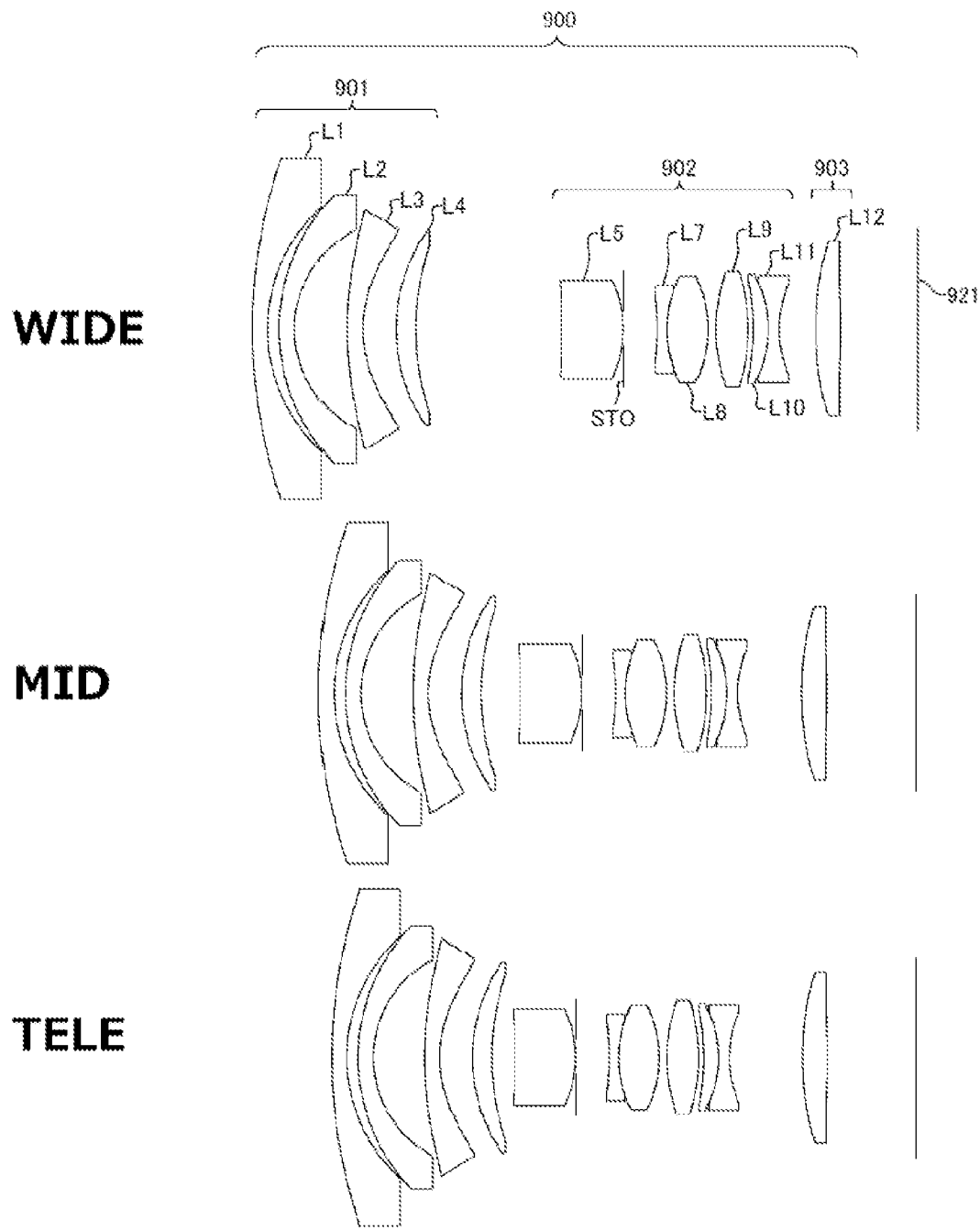
FIG. 9 illustrates lens configurations of a lens system 900 according to a second example.

FIG. 9 illustrates lens configurations of a lens system 900 according to a second example, together with the imaging element 221. The lens system 900 can include a first lens group 901, a second lens group 902, and a third lens group 903. The first lens group 901, the second lens group 902, and the third lens group 903 correspond, respectively, to the first lens group 301, the second lens group 302, and the third lens group 303 in the lens system 300. The description of the lens system 900 touches only on features of the lens system 900 that differ from those of the lens system 300, and descriptions of similar features are omitted. Where no particular description is given for reference signs or the like used with the lens system 900, those reference signs or the like convey the same meaning as in the lens system 300.

FIG. 9 illustrates the positions of the first lens group 901, the second lens group 902, and the third lens group 903 at each of the wide angle end, the intermediate angle of view, and the telephoto end.

Table 6 gives lens data for the lenses in the lens system 900.

TABLE 6

| Surface no. | R | Di | n | v |
|---|---|---|---|---|
| 1 | 43.1108 | 1.250 | 1.497 | 81.61 |
| 2 | 13.7084 | 0.950 | | |
| 3 | 15.8043 | 1.269 | 1.59282 | 68.63 |
| 4 | 9.2123 | 4.310 | | |
| 5* | 31.6680 | 1.269 | 1.497 | 81.61 |
| 6* | 10.1003 | 2.750 | | |
| 7 | 14.0492 | 1.639 | 1.95375 | 32.32 |
| 8 | 21.5844 | 12.060 | | |
| 9* | 203.4096 | 5.124 | 1.59201 | 67.02 |
| 10* | −9.5145 | 0.000 | | |
| STO | INF | 2.820 | | |
| 11 | −21.2696 | 0.800 | 1.76182 | 26.61 |
| 12 | 9.8339 | 3.415 | 1.497 | 81.61 |
| 13 | −9.6614 | 0.644 | | |
| 14 | 14.4544 | 2.661 | 1.92286 | 20.88 |
| 15 | −15.3422 | 0.407 | | |
| 16 | −20.9324 | 1.274 | 1.497 | 81.61 |
| 17 | −9.2278 | 0.900 | 1.84666 | 23.78 |
| 18 | 9.6164 | 3.011 | | |
| 19* | 30.6731 | 2.062 | 1.59201 | 67.02 |
| 20* | −80 | 6.389 | | |
| 21 | INF | 0.000 | | |

Those surfaces in Table 6 having a * appended to the surface number are aspheric surfaces. Table 7 gives the surface numbers of the aspheric surfaces and aspheric parameters for the lens system 900. "A," "B," "C," and "D" are, respectively, fourth-order, sixth-order, eighth-order, and tenth-order aspheric coefficients.

TABLE 7

| Surface no. | K | A | B | C | D |
|---|---|---|---|---|---|
| 5 | 0.00000E+00 | −1.27119E−05 | 3.17630E−07 | −7.50536E−09 | 3.97421E−11 |
| 6 | 0.00000E+00 | −1.24515E−04 | −1.11142E−06 | −8.40434E−09 | −1.32273E−10 |
| 9 | 0.00000E+00 | −5.51456E−04 | −6.26122E−06 | 7.42880E−10 | 0.00000E+00 |
| 10 | 0.00000E+00 | −4.75595E−05 | −1.37644E−06 | 6.16164E−08 | 0.00000E+00 |
| 19 | 0.00000E+00 | 1.09624E−04 | −1.61116E−10 | −9.57886E−09 | 0.00000E+00 |
| 20 | 0.00000E+00 | 1.41803E−04 | −1.01149E−07 | −1.65211E−08 | 0.00000E+00 |

Table 8 gives the focal lengths of the lens system 900 at each of the wide angle end, the intermediate angle of view, and the telephoto end, and gives the F number and the half-angle of view. The focal length is a value for light at a wavelength of 546.07 nm.

TABLE 8

|  | Wide angle end | Intermediate angle of view | Telephoto end |
| --- | --- | --- | --- |
| f | 7.540 | 11.160 | 12.064 |
| Fno | 3.580 | 3.580 | 3.580 |
| ω | 48.167 | 36.268 | 34.681 |

When the lens system 900 changes the focal length between the wide angle end and the telephoto end, a surface spacing D8 between the first lens group 901 and the second lens group 902, a surface spacing D18 between the second lens group 902 and the third lens group 903, and a surface spacing D20 between the third lens group 903 and the imaging element 221 can change. Table 9 gives the focal lengths and the surface spacings of the entire lens system 900 at each of the wide angle end, the intermediate angle of view, and the telephoto end.

TABLE 9

|  | Wide angle end | Intermediate angle of view | Telephoto end |
| --- | --- | --- | --- |
| f | 7.540 | 11.160 | 12.064 |
| D8 | 12.060 | 3.179 | 1.900 |
| D18 | 3.011 | 5.294 | 6.142 |
| D20 | 6.389 | 7.410 | 7.469 |

Table 10 indicates the focal length of each of the first lens group 901, the second lens group 902, and the third lens group 903.

TABLE 10

| Lens group | Focal length |
| --- | --- |
| First lens group | −17.5 |
| Second lens group | 13.71 |
| Third lens group | 37.58 |

Figure 10:
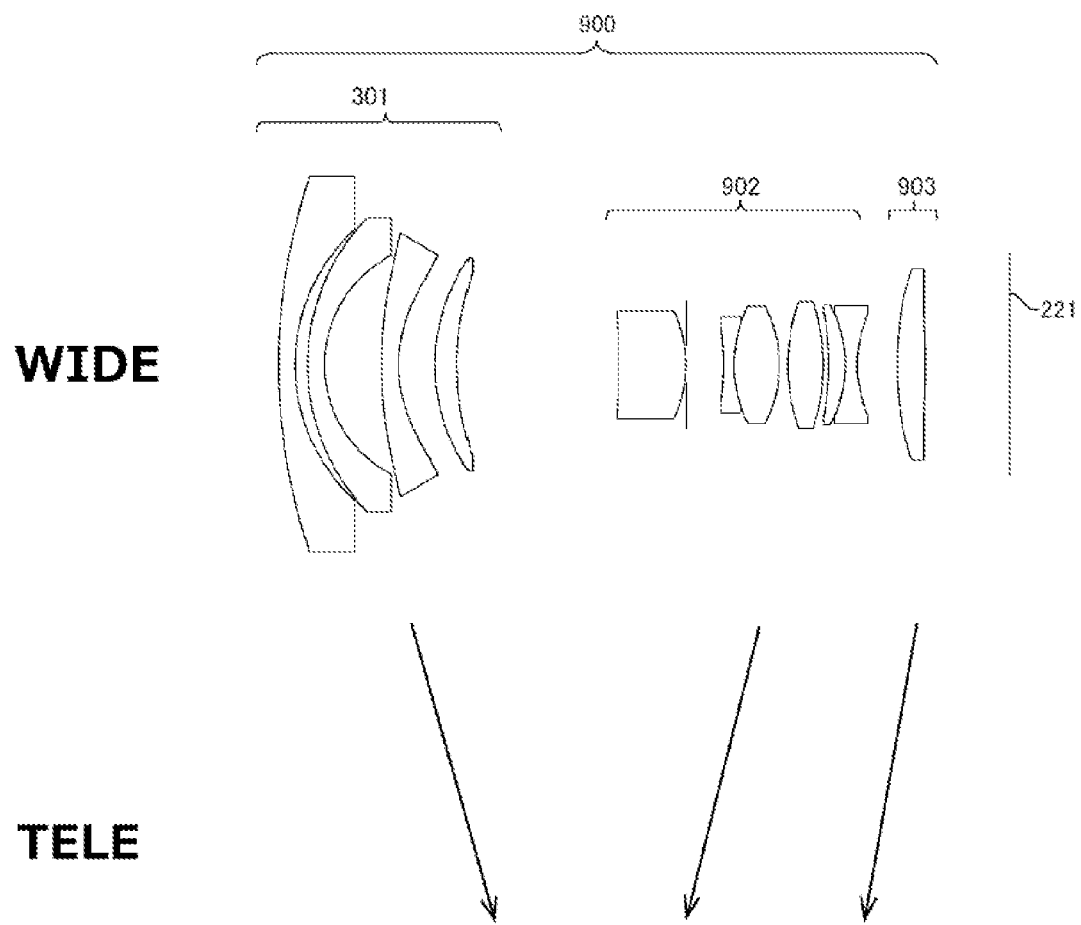
FIG. 10 schematically illustrates a movement path of each lens group when changing from a wide angle end to a telephoto end.

FIG. 10 schematically illustrates a movement path traveled by the first lens group 901, the second lens group 902, and the third lens group 903 when the lens system 900 changes from the wide angle end to the telephoto end. Arrows indicate movement during the change in focal length of the lens system 900. As illustrated in FIGS. 9 and 10, the space from the first lens group 901 to the imaging element 221 is variable when changing the focal length.

The first lens group 901 can include four lenses: from the object side, a negative lens L1, a negative lens L2, a negative lens L3, and a positive lens L4. In the second example, L1 is a reference sign for indicating that a lens of an optical element is ith place from the object side. Even when the same reference sign as a reference sign Li assigned to a lens in the first example is used in the second example, this does not indicate that the lens is the same.

By configuring the first lens group 901 to include four lenses (the negative lens L1, the negative lens L2, the negative lens L3, and the positive lens L4), an off-axis light ray on the wide angle side that has a larger incident angle, in particular, can be gently bent. Therefore, off-axis aberrations such as distortion, coma, and field curvature can be favorably corrected. In addition, spherical aberration on the telephoto side can be favorably corrected. Also, because the negative refractive power of the first lens group 901 is distributed between the three negative lenses L1 to L3, the negative refractive power of the first lens group 901 can be increased while limiting aberration. Furthermore, the total length of the lens system 900 can be shortened.

In some embodiments, the Abbe numbers v of the negative lenses L1 to L3 of the first lens group 901 can all satisfy the conditional expression v>60. The negative lenses included in the first lens group 901 can be formed of a low-dispersion glass material, and thereby chromatic aberration of magnification on the wide angle side and axial chromatic aberration on the telephoto side can be favorably corrected.

The second lens group 902 can include, from the object side, a positive single lens L5, an aperture STO, a negative/positive doublet L7 and L8, a positive single lens L9, and a positive/negative doublet L10 and L11. The single lens L5 can correspond to the first lens sub-group described above. The negative/positive doublet L7 and L8 can correspond to the second lens sub-group described above. An object-side surface and a focal plane-side surface of the positive single lens L5 can be aspheric. When at least one surface of the positive single lens L5, which is closest to the object side, is configured to be aspheric, spherical aberration can be more favorably corrected. The positive single lens L5 may also include only one surface that is aspheric.

The aperture STO can be positioned between the positive single lens L5 and the negative/positive doublet designated by L7 and L8. With such an arrangement, the spacing between the first lens group 301 and the second lens group 302 can be shortened on the telephoto side. Thus, the total length of the lens system 900 can be shortened.

As illustrated in FIGS. 9 and 10, the space between the first lens group 901 (with negative refractive power) and the imaging element 221 is variable when changing from the wide angle end to the telephoto end. When changing from the wide angle end to the telephoto end, the first lens group 901 can move monotonically toward the imaging element 221. When changing from the wide angle end to the telephoto end, the second lens group 902 can move monotonically from the imaging element 221 side toward the object. When changing from the wide angle end to the telephoto end, the third lens group 903 can move monotonically toward the object. The second lens group 902 is primarily responsible for changing the focal length, and the third lens group 903 assumes secondary responsibility for changing the focal length. The third lens group 903 can also be responsible for correcting focal plane variation that accompanies the change in focal length.

Figure 11:
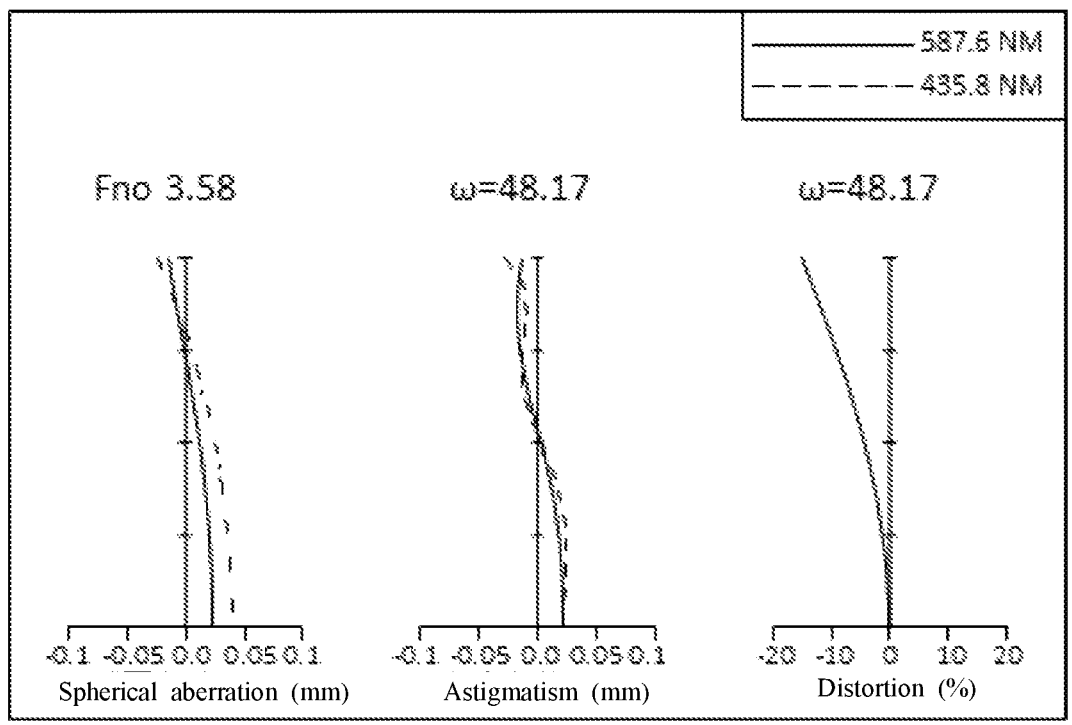
FIG. 11 illustrates spherical aberration, astigmatism, and distortion at the wide angle end.
Figure 12:
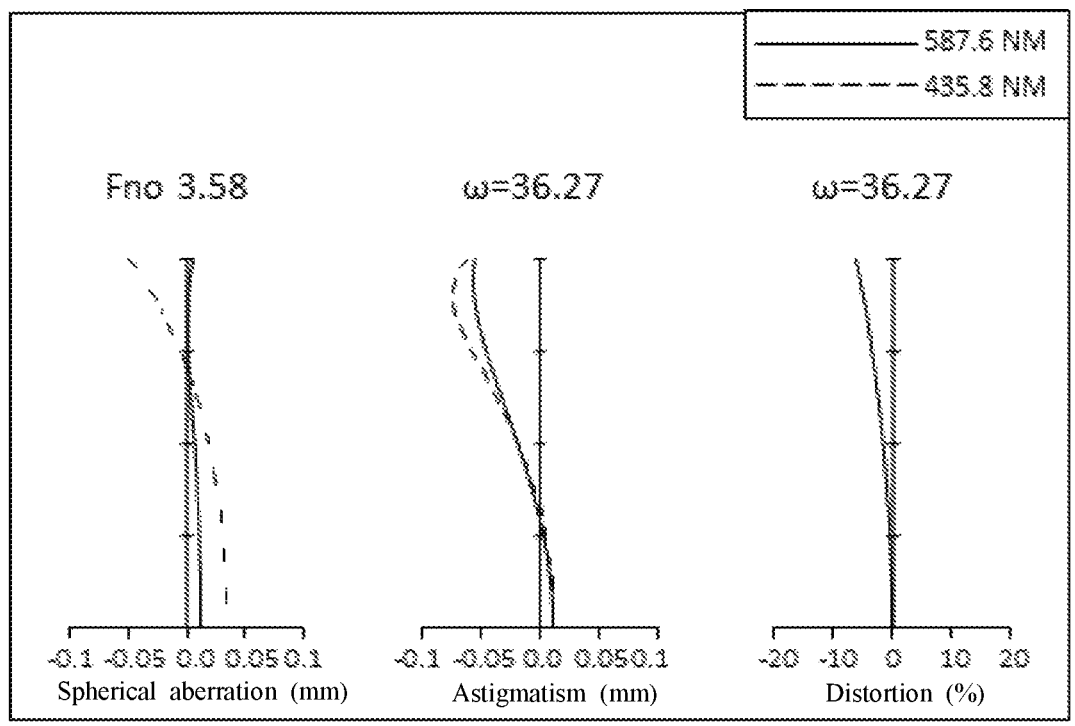
FIG. 12 illustrates spherical aberration, astigmatism, and distortion at an intermediate angle of view.
Figure 13:
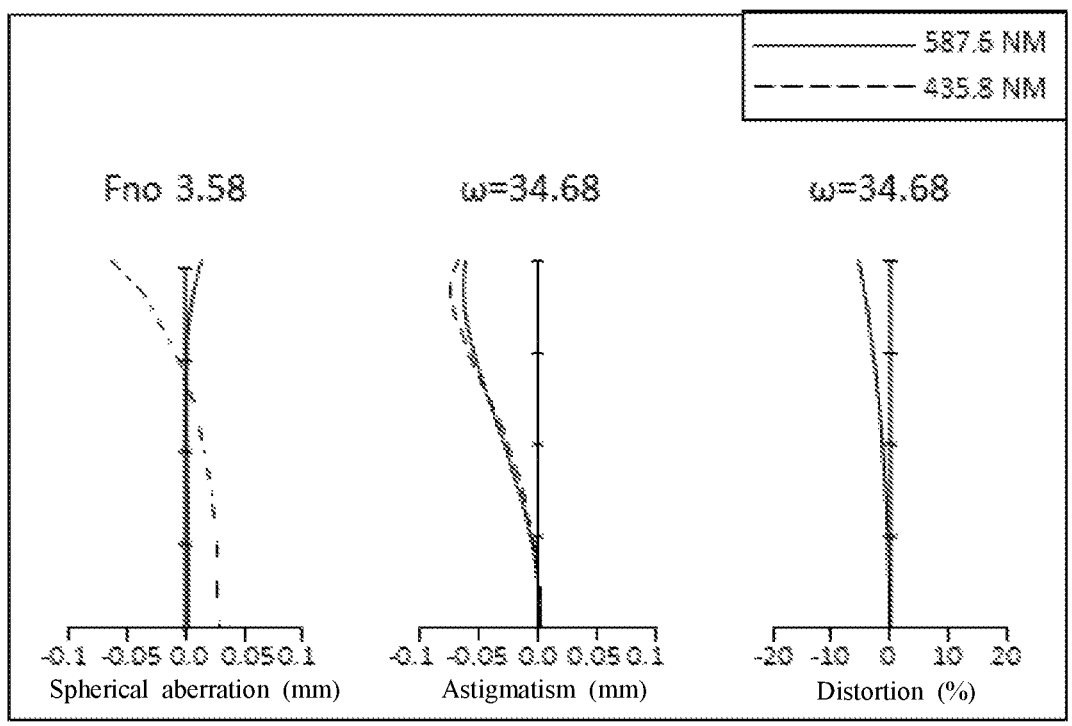
FIG. 13 illustrates spherical aberration, astigmatism, and distortion at the telephoto end.

FIG. 11 illustrates spherical aberration, astigmatism, and distortion at the wide angle end. FIG. 12 illustrates spherical aberration, astigmatism, and distortion at the intermediate angle of view. FIG. 13 illustrates spherical aberration, astigmatism, and distortion at the telephoto end.

In the spherical aberration diagrams depicted in FIGS. 11 to 13, a solid line indicates the d-line (587.6 nm) value and a dashed line indicates the g-line (435.8 nm) value. In the astigmatism diagrams depicted in FIGS. 11 to 13, a solid line indicates the d-line sagittal plane value and a dashed line indicates the d-line meridional plane value. The distortion diagrams depicted in FIGS. 11 to 13 illustrate values for the d-line. Each of these aberration diagrams makes clear that the various aberrations can be favorably corrected in the lens system 900, and that the lens system 900 can provide superior imaging performance.

Figure 14:
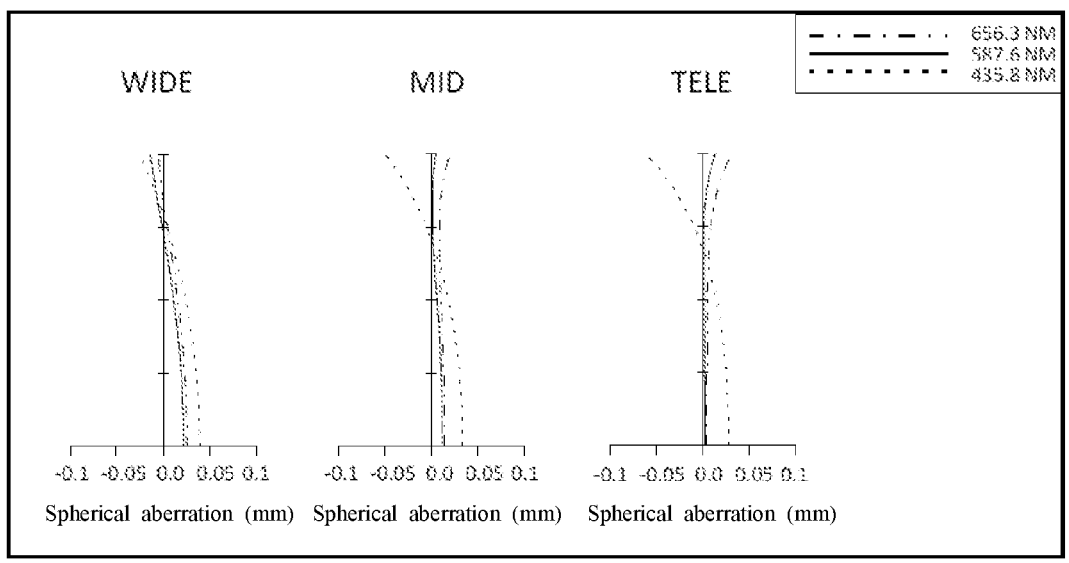
FIG. 14 illustrates the spherical aberration of the lens system 900 with light at three wavelengths.

FIG. 14 illustrates the spherical aberration of the lens system 900 with light at three wavelengths. A dot-dash line indicates the c-line (656.3 nm) value, a solid line indicates the d-line (587.6 nm) value, and a dashed line indicates the g-line (435.8 nm) value. At each of the wide angle end, intermediate angle of view, and telephoto end, the spherical aberration for each wavelength of light can be constrained to a range within 0.1 mm. This makes clear that axial chromatic aberration can be favorably corrected.

Table 11 collectively gives numerical values associated with the conditional expressions of the first and second examples. In Table 11, the numerical values corresponding to Conditional Expression 1, Conditional Expression 2, and Conditional Expression 3 indicate the Abbe numbers for the negative lens L1, the negative lens L2, and the negative lens L3, respectively. The numerical value corresponding to Conditional Expression 4 indicates a value of f1/fw. The numerical value corresponding to Conditional Expression 5 indicates a value of f2/fw. The numerical values corresponding to Conditional Expression 6 and Conditional Expression 7 respectively indicate the refractive index and the Abbe number of the lens with positive refractive power in the first lens group 301. The numerical value corresponding to Conditional Expression 8 indicates a value of Da/D2.

TABLE 11

| | Cond. Exp. 1 | Cond. Exp. 2 | Cond. Exp. 3 | Cond. Exp. 4 | Cond. Exp. 5 | Cond. Exp. 6 | Cond. Exp. 7 | Cond. Exp. 8 |
|---|---|---|---|---|---|---|---|---|
| First example | 81.61 | 81.61 | 81.61 | −1.87 | 1.97 | 1.95 | 32.32 | 0.20 |
| Second example | 81.61 | 68.63 | 81.61 | −2.32 | 1.82 | 1.95 | 32.32 | 0.28 |

With the lens system 300 and the lens system 900 described above, a compact zoom lens can be provided that features a wide angle of view and high resolution. For example, a wide-angle zoom lens can be provided that is compact, features high resolution, and includes a half-angle of view at the wide angle end that exceeds 45°.

Figure 15:
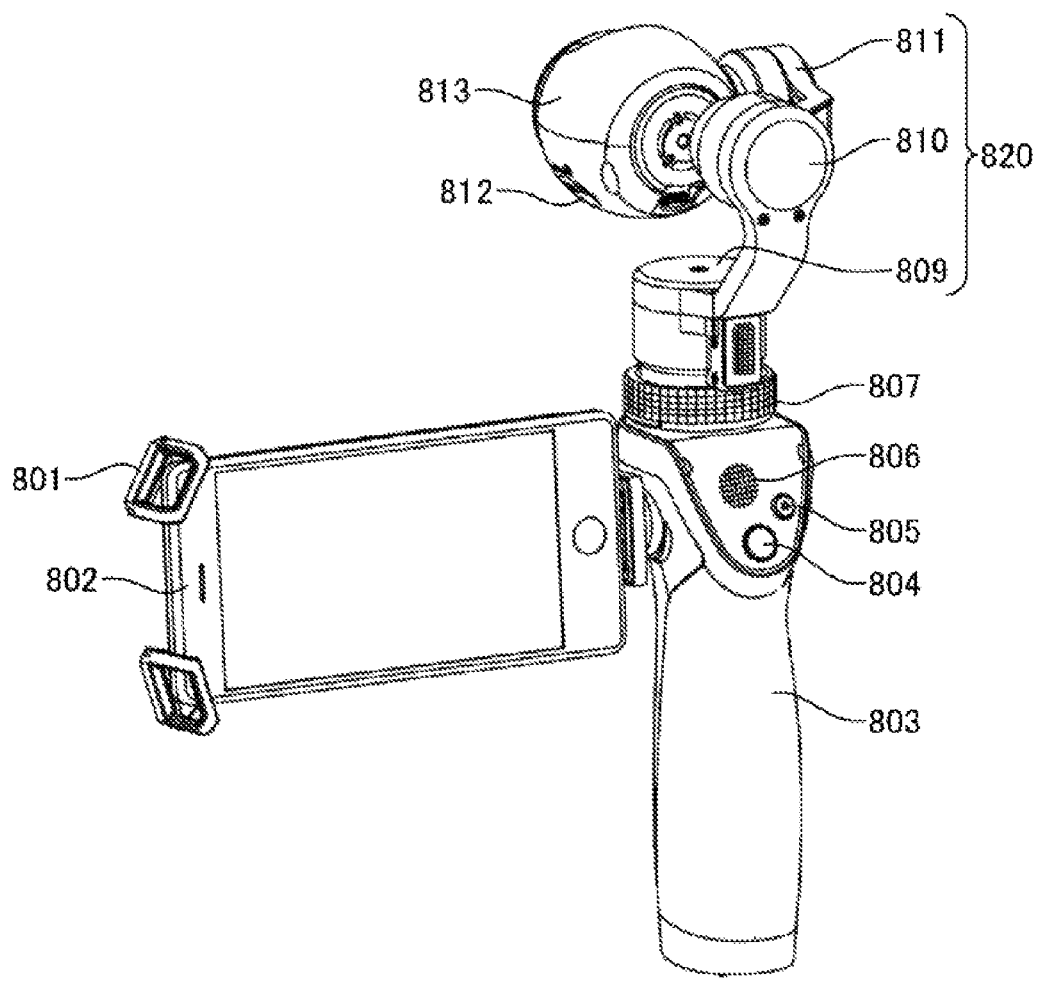
FIG. 15 is an exterior perspective view of one example of a stabilizer 800.

FIG. 15 is an exterior perspective view of one example of a stabilizer 800. The stabilizer 800 is another example of a movable object. For example, a camera unit 813 provided to the stabilizer 800 can include an imaging device having a configuration similar to that of the imaging device 220. The camera unit 813 can also include a lens device having a configuration similar to that of the lens device 160.

The stabilizer 800 can include the camera unit 813, a gimbal 820, and a holding arm 803. The gimbal 820 can rotatably support the camera unit 813. The gimbal 820 can include a pan axis 809, a roll axis 810, and a tilt axis 811. The gimbal 820 can rotatably support the camera unit 813 to rotate centered on the pan axis 809, the roll axis 810, and the tilt axis 811. The gimbal 820 is one example of a carrier.

The camera unit 813 is one example of an imaging device. The camera unit 813 can include a slot 812 for inserting memory. The gimbal 820 is fixed to the holding arm 803 via a holder 807.

The holding arm 803 can include various buttons for operating the gimbal 820 and the camera unit 813. The holding arm 803 can include a shutter button 804, a record button 805, and an operation button 806. By pressing down the shutter button 804, a still image can be recorded by the camera unit 813. By pressing down the record button 805, a moving image can be recorded by the camera unit 813.

A device holder 801 can be fixed to the holding arm 803. The device holder 801 can hold a mobile device 802 such as a smart phone. The mobile device 802 can be connected to the stabilizer 800 via a wireless network such as WiFi, so as to be capable of communication. Thus, an image captured by the camera unit 813 can be displayed on a screen of the mobile device 802.

Interference from the camera unit 813 with other regions of the stabilizer 800 can also be inhibited.

In the foregoing, the UAV 100 and stabilizer 800 are described as one example of the movable object. An imaging device with a configuration similar to that of the imaging device 220 can also be attached to a movable object other than the UAV 100 and stabilizer.

An imaging device mounted to the movable object is described above. However, an imaging device with a configuration similar to that of the imaging device 220 is not limited to an imaging device that is mounted on a movable object. A configuration similar to that of the imaging device 220 can be applied to a non-interchangeable lens-type camera (what is known as a compact digital camera, for example). A configuration similar to that of the lens device 160 can be applied to an interchangeable lens of an interchangeable lens-type camera, such as a single lens reflex camera. A configuration similar to that of the lens device 160 can be applied to the configurations of various other lens devices used for imaging.

The present disclosure is described using embodiments, but the technical scope of the disclosure is not limited to the scope of the above embodiments. It should be clear to a person skilled in the art that the above embodiments are open to various modifications or improvements. It should also be clear from the scope of the claims that forms having such modifications or improvements can be included in the technical scope of the present disclosure.

The order of each process in the operations, procedures, steps, stages, and the like of the devices, systems, programs, and methods in the scope of the claims, specification, and drawings is not specifically disclosed using "beforehand," "in advance," and the like, and any order is possible as long as a postprocess does not use the output of a preprocess. Even if "first," "next," and the like are used for convenience in describing the flow of operations in the scope of the claims, specification, and drawings, it is not meant that it must be executed in this order.

DESCRIPTION OF REFERENCE NUMERALS

10 Movable object system
50 Controller
52 Operation unit
54 Display unit
100 UAV 101 UAV body
102 Interface
104 Control unit
106 Memory
110 Gimbal
112 Control unit
114, 116, 118 Driver
124, 126, 128 Drive unit
130 Carrier
134, 136, 138 Rotation mechanism
140 Imaging unit
160 Lens device
161 Actuation mechanism
162 Control unit
163 Memory
220, 230 Imaging device
221 Imaging element
222 Control unit
223 Memory
231 Imaging element
232 Control unit
233 Memory
234 Control unit
235 Lens
300 Lens system
301 First lens group
302 Second lens group
303 Third lens group
800 Stabilizer
801 Device holder
802 Mobile device
803 Holding arm
804 Shutter button
805 Record button
806 Operation button
807 Holder
809 Pan axis
810 Roll axis
811 Tilt axis
812 Slot
813 Camera unit
820 Gimbal
900 Lens system
901 First lens group
902 Second lens group
903 Third lens group

What is claimed is:

1. A zoom lens comprising, in an order from a first side of the zoom lens toward a second side of the zoom lens:
a first lens group with a negative refractive power, a second lens group with a positive refractive power, and a third lens group with a positive refractive power;
wherein:
the first lens group, the second lens group, and the third lens group are configured such that, when the zoom lens changes from a wide angle end to a telephoto end, a spacing between the first lens group and the second lens group is reduced, and a spacing between the second lens group and the third lens group changes;
the first lens group includes, in an order from the first side toward the second side, a first lens, a second lens, a third lens, and a fourth lens, refractive powers of the first lens, the second lens, and the third lens being negative, a refractive power of the fourth lens being positive, and Abbe numbers of the first lens, the second lens, and the third lens being larger than 60; and
a ratio of a focal length of the first lens group to a wide-angle-end focal length of the zoom lens is larger than −2.5 and smaller than −1.2.

2. The zoom lens of claim 1, wherein:
the second lens group includes an aspheric lens with a positive refractive power and two doublets arranged between the aspheric lens and the second side of the zoom lens, each of the two doublets including a positive lens;
an Abbe number of the positive lens of each of the two doublets is larger than 60; and
a ratio of a focal length of the second lens group to the wide-angle-end focal length of the zoom lens is larger than 1.3 and smaller than 2.6.

3. The zoom lens of claim 2, wherein the third lens group includes a single lens or a doublet.

4. The zoom lens of claim 2, wherein:
the first lens of the first lens group includes a spherical lens; and
one of the second lens and the third lens of the first lens group includes an aspheric lens or each of the second lens and the third lens of the first lens group includes an aspheric lens.

5. The zoom lens of claim 2, wherein a refractive index of the fourth lens of the first lens group is larger than 1.9 and an Abbe number of the fourth lens of the first lens group is smaller than 35.

6. The zoom lens of claim 2, further comprising:
an aperture configured to move integrally with the second lens group when the zoom lens changes between the wide angle end and the telephoto end.

7. The zoom lens of claim 2, wherein:
the second lens group includes, in an order from the first side toward the second side, a first lens sub-group, an aperture, and a second lens sub-group; and
a ratio of a spacing between a surface closest to the first side and a surface closest to the second side in the first lens sub-group to a spacing between a surface closest to the first side and a surface closest to the second side in the second lens group is smaller than 0.35.

8. An imaging device comprising:
the zoom lens of claim 2; and
a photosensor configured to receive light passing through the zoom lens.

9. A movable object comprising the zoom lens of claim 2.

10. The movable object of claim 9, wherein the movable object is an unmanned aerial vehicle.

11. A system comprising:
the zoom lens of claim 2;
a carrier movably supporting the zoom lens; and
a holding arm attached to the carrier.

12. The zoom lens of claim 1, wherein the third lens group includes a single lens or a doublet.

13. The zoom lens of claim 1, wherein:
the first lens of the first lens group includes a spherical lens; and
one of the second lens and the third lens of the first lens group includes an aspheric lens or each of the second lens and the third lens of the first lens group includes an aspheric lens.

14. The zoom lens of claim 1, wherein a refractive index of the fourth lens of the first lens group is larger than 1.9 and an Abbe number of the fourth lens of the first lens group is smaller than 35.

15. The zoom lens of claim 1, further comprising:
an aperture configured to move integrally with the second lens group when the zoom lens changes between the wide angle end and the telephoto end.

16. The zoom lens of claim 1, wherein:
the second lens group includes, in an order from the first side toward the second side, a first lens sub-group, an aperture, and a second lens sub-group; and
a ratio of a spacing between a surface closest to the first side and a surface closest to the second side in the first lens sub-group to a spacing between a surface closest to the first side and a surface closest to the second side in the second lens group is smaller than 0.35.

17. An imaging device comprising:
the zoom lens of claim 1; and
a photosensor configured to receive light passing through the zoom lens.

18. A movable object comprising the zoom lens of claim 1.

19. The movable object of claim 18, wherein the movable object is an unmanned aerial vehicle.

20. A system comprising:
the zoom lens of claim 1;
a carrier movably supporting the zoom lens; and
a holding arm attached to the carrier.

* * * * *